(12) United States Patent
Janicek et al.

(10) Patent No.: US 6,239,523 B1
(45) Date of Patent: May 29, 2001

(54) CUTOUT START SWITCH

(75) Inventors: Alan Joseph Janicek, Morrison; Larry C. Fogel, Savanna, both of IL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/346,279

(22) Filed: Jul. 1, 1999

(51) Int. Cl.[7] .................................................. H02P 1/42

(52) U.S. Cl. .................. 310/68 C; 318/786; 318/788; 318/753; 318/792

(58) Field of Search ........................... 310/68 C, 68 R; 318/778, 783, 785, 788, 791, 792, 753, 786

(56) References Cited

U.S. PATENT DOCUMENTS 5,952,811 * 9/1999 Hamatani .............................. 318/788

* cited by examiner

Primary Examiner—Nestor Ramirez
Assistant Examiner—Judson H. Jones
(74) Attorney, Agent, or Firm—Carl B. Horton, Esq.; Damian Wasserbauer, Esq.; Armstrong Teasdale LLP

(57) ABSTRACT

A motor start switch includes a temperature responsive resistor element and a bimetal cutout switch electrically connected in series with a start winding of an electric motor. The cutout switch is operable between an open position disconnecting the temperature responsive resistor from the start winding, and a closed position electrically connecting the temperature responsive resistor to the start winding. The cutout switch transitions from the open position to the closed position due to current flowing through, and heating, a bimetal element in the cutout switch.

21 Claims, 1 Drawing Sheet

CUTOUT START SWITCH

BACKGROUND OF THE INVENTION

This invention relates generally to electric motors and, more particularly, to a start winding cutout switch for a refrigerator compressor motor.

Electric motors typically include a start winding, a run winding and a magnetized rotor. The start winding is used to initiate rotation of the rotor. The run winding has a high inductive reactance relative to the start winding, so that the magnetic fields generated in the respective windings are out of phase with one another. The geometric time phase relationship between the magnetic fields causes the rotor to begin to rotate from a standstill condition when the windings are energized. Once the rotor has sufficient torque to attain its normal operating speed, the start winding is "cut-out" of the motor circuit so that the magnetic field generated by the start winding does not adversely affect motor operation. Alternatively, the start winding may be utilized as an auxiliary run winding after motor start-up by connecting a run capacitor in series with the start winding. Often, utilizing an auxiliary run winding results in better motor efficiency and power factor.

Low power current relays have been used to switch a start winding out of a motor circuit. However, the relays contacts are often short lived and susceptible to sticking together when switching the current, which would continuously energize the motor and cause burnout.

A positive temperature coefficient resistor (PTCR) may be used in lieu of a relay to regulate the current flowing through the motor start winding. A PTCR is a temperature responsive resistor element that has a low resistance in a cool state, and a very high resistance when heated to an "anomaly temperature" or "Curie Temperature." When a PTCR is connected in series with a start winding, the low initial resistance in the cool state allows the start winding to draw a relatively large current to accomplish initial motor rotation. As current flows through the PTCR, the current heats the PTCR, ultimately causing the PTCR to reach the Curie Temperature and the corresponding very high resistance state. Consequently, very little current flows into the start winding. Thus, the PTCR restricts or "chokes off" the current to the start winding to negligible levels. By selecting a PTCR so that the Curie Temperature is reached at approximately the same time when the motor running speed is achieved, a PTCR effectively regulates current flow into the start winding more reliably than a current relay.

A PTCR, however, consumes 2–3 watts of power to maintain the high resistance state at the Curie Temperature. In light of stringent energy consumption standards, PTCR energy consumption is a factor in the efficiency rating of a compressor motor. Therefore, energy savings could be realized, and efficiency ratings increased, by cutting the PTCR out of a circuit. While relay switches have been used in series with a PTCR to switch the PTCR out of the circuit, relay switches require power to keep the switch open, which affects the efficiency rating of the motor. Also, relay switches suffer from reliability problems with the switching contacts.

Accordingly, it would be desirable to provide a reliable cutout switch to remove a PTCR from a motor circuit. Further, it would be desirable to provide a cutout switch which does not consume power to keep the switch open.

BRIEF SUMMARY OF THE INVENTION

In an exemplary embodiment of the invention, a motor start switch includes a temperature responsive resistor element and a cutout switch in series with the start winding of a motor. The temperature responsive resistor element is a positive temperature coefficient resistor ("PTCR"). The cutout switch is operable between an open position disconnecting the PTCR from the start winding, and a closed position electrically connecting the PTCR to the start winding.

When electrical power is supplied to the motor, current flows through the run winding to energize the run winding, and the closed cutout switch allows current to flow through the start winding and the PTCR through the cutout switch. The PTCR is cool and has a low resistance, which allows large startup currents to flow through the PTCR and into the start winding to accomplish initial rotor rotation.

As current flows through the PTCR and the cutout switch, both the PTCR and the cutout switch are heated by the current flowing through them. As the PTCR heats, its resistance increases, and less current flows through the start winding. When the PTCR reaches its Curie Temperature, its resistance is high enough that the current running through the start winding is negligible. At approximately the same time the PTCR Curie Temperature is reached, a bimetal element in the cutout switch reaches a temperature which causes the bimetal element to deflect and break electrical contact with the PTCR. Current continues to flow through the bimetal element in the deflected position, generating heat in the bimetal element and keeping the cutout switch open. Because no current flows through the PTCR when the cutout switch is open, the PTCR consumes no power and begins to cool. As the PTCR cools, it returns to the low resistance state.

When electric power to the motor is switched off, the bimetal element in the cutout switch cools and resets to a closed position in electrical contact with the PTCR. When electrical power is returned to the motor, the closed cutout switch allows current to flow to the PTCR in the low resistance state, which allows large startup current to flow through the start winding. The current heats the PTCR and the switch until the PTCR reaches the Curie Temperature and the cutout switch opens.

Thus, a reliable motor start switch disconnects the PTCR from the start winding and eliminates power consumption by the PTCR. In contrast to a relay switch, the bimetal cutout switch does not require external power to open the switch and disconnect the PTCR from the motor circuit due to its mechanical nature. In addition, current flowing through the cutout switch bimetal element generates heat to maintain the switch in the open position, so external electrical or mechanical elements are not required to keep the switch open. While the cutout switch bimetal element dissipates power as heat generated from current flowing through the bimetal element when the cutout switch is open, the power consumed by the bimetal element is a small fraction of the power consumption of the PTCR. Thus, an increased percentage of electrical power supplied to the motor is dissipated in the run winding and the start winding, and the efficiency rating of the motor is increased.

DETAILED DESCRIPTION OF THE INVENTION

Figure 1:
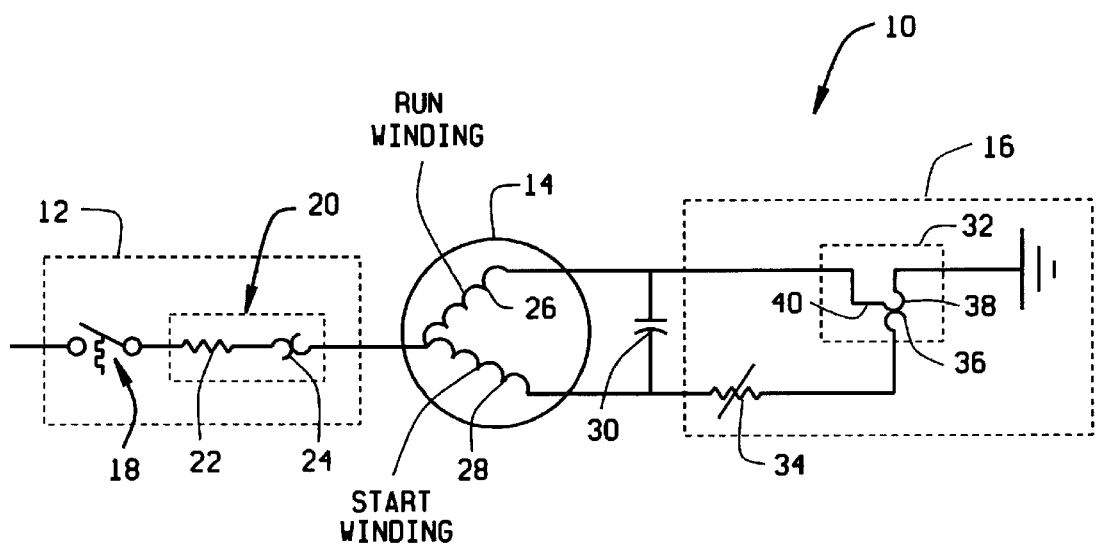
FIG. 1 is a circuit schematic of a refrigerator compressor circuit including a start switch in a closed position.

FIG. 1 is a circuit schematic of a refrigerator compressor 10 including a motor control 12, a motor 14, and a motor start switch 16. Motor control 12 is electrically connected in series with motor 14 and includes a thermostat 18 and an overload protector 20. Thermostat 18 connects compressor 10 to an electrical power source (not shown) and cycles motor 14 from an "ON" state to an "OFF" state upon occurrences of selected conditions.

Overload protector 20 includes a heater element 22 in thermal contact with a bimetal element 24. When motor 14 is "ON," current flows through resistance heater element 22 and bimetal element 24 to motor 14. In instances of excessive, or prolonged, current flowing through heater element 22 to motor 14, or upon other specified fault conditions, heater element 22 reaches a predetermined temperature that causes bimetal element 24 to open and break electrical contact with motor 14. Overload protector 20 therefore protects motor 14 from overheating and burnout. The predetermined temperature which causes bimetal element 24 to open is selected to keep the motor winding temperature to less than a maximum temperature specified by the compressor motor manufacturer.

Motor 14 includes a run winding 26, a start winding 28, and a run capacitor 30 electrically connected to one another. Run capacitor 30 is electrically connected in series with start winding 28 so that start winding 28 remains in the motor circuit as an auxiliary run winding. In an alternative embodiment, motor 14 includes one or more auxiliary windings electrically connected in series with start winding 28.

Start switch 16 includes a cutout switch 32 and a temperature responsive resistor 34 electrically connected in series with start winding 28 and in parallel with run capacitor 30. Cutout switch 32 includes a stationary contact 36, a movable contact 38, and a bimetal element 40 connected to moveable contact 38. Cutout switch 32 has an open position and a closed position. In the closed position, stationary contact 36 and movable contact 38 form an electrical connection through cutout switch 32. In the open position, stationary contact 36 and movable contact 38 are separated from one another which prevents an electrical connection, i.e., prevents current flow, through cutout switch 32.

Bimetal element 40 includes two metallic strips (not shown) connected to one another. Each metallic strip has a different coefficient of thermal expansion so that each strip expands at a different rate. As current flows through bimetal element 40 heat is generated within bimetal element 40, causing the metallic strips to expand. However, since the metallic strips expand at different rates, bimetal element 40 bends or curls as the metallic strips are heated. Therefore, at a predetermined temperature, i.e., the transition temperature, bimetal element 40 curls or deflects, causing moveable contact 38 to separate from stationary contact 36 and to open or break the electrical circuit through cutout switch 32. Bimetal element 40 may be a snap action or creep type bimetal element. Unlike relay and other electrical switches, which require external electrical power to open and close the contacts, bimetal element 40 mechanically opens and closes cutout switch 32. Therefore, in contrast to a relay switch, additional power in not required to open or close the switch.

Temperature responsive resistor 34 is a positive temperature coefficient resistor (PTCR) having a low resistance when in a cool state and a high resistance when in a heated state. An exemplary temperature responsive resistor 34 is a disk type PTCR, such as a PTCR disk available from CeraMite, a company located in Grafton, Wis. PTCR 34 is selected to be the minimum size which satisfies resistance/current/voltage conditions to optimize the cooling rate of PTCR 34. PTCR is separated from, or external to, start winding 28. In an alternative embodiment, PTCR 34 is internal to, or part of, start winding 28.

Exemplary ratings of PTCR 34 are set forth below:
Cold Resistance, 5 ohms to 15 ohms, 180 vac, 12 amp
Maximum Curie Temperature 125 C.
5.5 ohms resistance at 25 C.
Life: 50,000 starts (minimum).

PTCR 34 which satisfies the above ratings effectively disconnects, or takes out, start winding 28 in less than 0.75–1.0 seconds at 8.0 amps during the motor startup for a cold start, and resets within 80 seconds in the event that power is cut-off.

Cutout switch bimetal element 40 is selected to reach its predetermined transition temperature so that bimetal element 40 opens and breaks the circuit at approximately the same time as PTCR 34 reaches the Curie Temperature. Suitable bimetal-type switches for this application are commercially available from Otter Controls, Limited, Hardwick Square South, Buxton, Derbyshire, SK17, 6LA, England. The transition temperature of bimetal element 40 is selected based on motor current and application conditions so that bimetal element 40 deflects after PTCR 34 reaches the Curie temperature but before overload protector 20 breaks electrical power to motor 14.

When electrical power is initially delivered to motor 14 through thermostat 18 and overload protector 20, cutout switch 32 is closed so that an electrical circuit is completed through stationary contact 36 and moveable contact 38. Also, PTCR 34 is well below the Curie Temperature and in the state of low resistance, so that when power is delivered to motor 14, relatively large startup currents flow through start winding 28 to generate the start winding magnetic field, and thus the desired torque, which causes the rotor (not shown) to begin rotating from a standstill condition. Upon startup, both run winding 26 and start winding 28 are energized, and the resistance of PTCR is sufficiently low so that run capacitor 30 is substantially electrically disassociated from run winding 26 and start winding 28.

The current flowing through cutout switch 32 causes bimetal element 40 and PTCR 34 to heat up. As PTCR 34 heats up, less current flows through PTCR 34 and start winding 28 and the magnetic field generated in start winding 28 is accordingly reduced. As current continues to flow through cutout switch 32 and PTCR 34, the current continues to heat bimetal element 40 and PTCR 34. Eventually, PTCR 34 will reach a steady state of high resistance at the Curie Temperature that prevents any appreciable current from flowing into start winding 28 and substantially electrically disassociates PTCR 34 from start winding 28. When PTCR 34 is substantially disassociated with start winding 28, run capacitor is substantially associated with start winding 28. Under such conditions, start winding 28 functions as an auxiliary main winding.

The PTCR 34 steady state is reached at approximately the same time motor 14 is brought up to speed. Subsequently, bimetal element 40 reaches its transition temperature so that bimetal element 40 deflects and moves movable contact 38 away from stationary contact 36 and opens the circuit through cutout switch 32.

Figure 2:
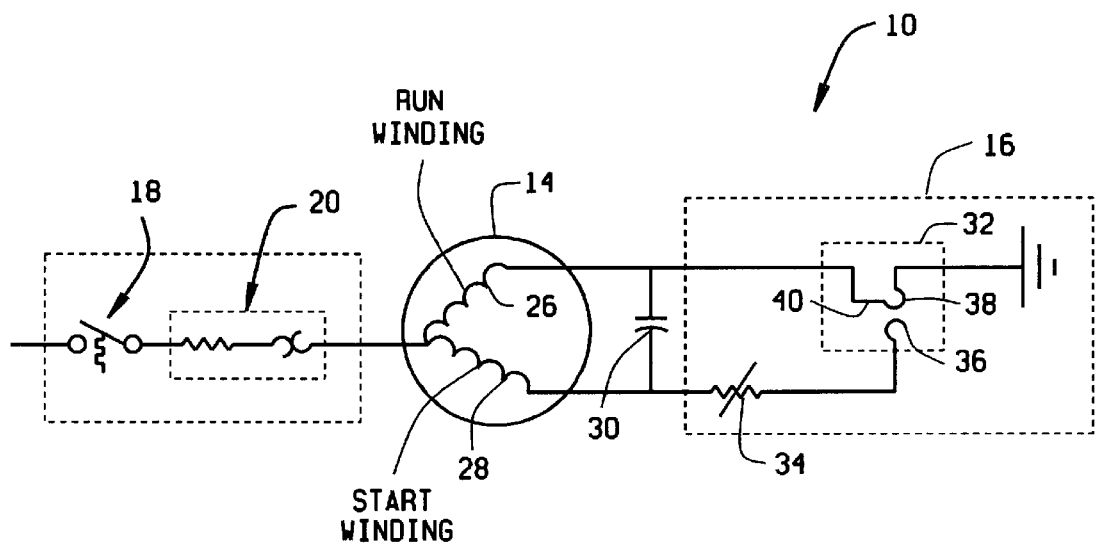
FIG. 2 is a circuit schematic of the compressor circuit shown in FIG. 1 with the start switch in an open position.

FIG. 2 is a schematic of compressor 10 with cutout switch 32 in an open position. Power is supplied to motor 14 through thermostat 18 and overload protector 20. Thus, run winding 26 is energized and maintains rotor rotation. Run capacitor 30 remains in the motor circuit and is electrically connected to run winding 26 and start winding 28. Start winding 28 therefore functions as an auxiliary winding.

Current continues to flow through run winding 26 and bimetal element 40, and consequently heat is generated in bimetal element 40 to keep bimetal element 40 in its deflected position where moveable contact 38 and stationary contact 36 are separated and electrical contact through cutout switch 32 is broken. PTCR 34 is thus disconnected from the circuit and power consumption by PTCR 34 is therefore avoided. While bimetal element 40 dissipates electrical power as heat when cutout switch 32 is open, power dissipation of cutout switch 32 is a small fraction of the power consumption of PTCR 34, and is generally on the order of minor power losses occurring in wires and electrical connectors. Therefore, as run capacitor 30 generally does not dissipate power, an increased percentage of electrical power delivered to motor 14 through thermostat 18 and overload protector 20 is dissipated in run winding 26 and start winding 28. When cutout switch 32 is in the open position electrical power to motor 14 is dissipated only in run winding 26, start winding 28, and bimetal element 40. Therefore, the energy efficiency rating of compressor 10 is increased.

Once cutout switch 32 is opened, PTCR 34 begins to cool and return to its initial state of low resistance. After power is disconnected to motor 14 via thermostat 18 or overload protector 20, current ceases to flow through bimetal element 40. Bimetal element 40 therefore begins to cool and reset to its initial closed position where an electrical connection is established through stationary contact 36 and movable contact 38. Start switch 16 is then ready for motor restart.

While the invention has been described in terms of various specific embodiments, those skilled in the art will recognize that the invention can be practiced with modification within the spirit and scope of the claims.

What is claimed is:

1. A motor start switch for an electric motor, the motor including a run winding, a start winding, and a run capacitor electrically connected to one another, said start switch comprising:
    a temperature responsive resistor element electrically connected in series with the start winding; and
    a cutout switch electrically connected in series with the run winding and in series with the start winding, wherein said cutout switch is electrically connected in series with said temperature responsive resistor, said cutout switch having an open position and a closed position, said cutout switch allowing current to flow to said temperature responsive resistor when in said closed position and electrically disconnecting said temperature responsive resistor when said cutout switch is in said open position, said cutout switch opening and closing in response to heat generated from current flowing therethrough.

2. A switch in accord with claim 1 wherein said temperature responsive resistor element is disposed external to said start winding.

3. A start switch in accordance with claim 1 wherein said temperature responsive resistor element comprises a positive temperature coefficient resistor.

4. A switch in accordance with claim 1 wherein the run capacitor remains connected to the start winding when said cutout switch is in said open position.

5. A switch in accordance with claim 4 wherein the start winding operates as an auxiliary run winding when said contact switch is in said open position.

6. A motor start switch for an electric motor, the motor including a run winding, a start winding, and a run capacitor electrically connected to one another, said start switch comprising:
    a temperature responsive resistor element electrically connected in series with the start winding; and
    a cutout switch electrically connected in series with the run winding and in series with the start winding, said cutout switch comprises a bimetal element.

7. A start switch in accordance with claim 6 wherein said cutout switch further includes a moveable contact and a stationary contact, said bimetal element moving said moveable contact from said stationary contact when said bimetal element reaches a predetermined temperature.

8. A start switch in accordance with claim 7 wherein said predetermined temperature is maintained by heat generated from current flowing through said bimetal element.

9. A start switch in accordance with claim 6 wherein said temperature responsive resistor element comprises a positive temperature coefficient resistor.

10. A switch in accordance with claim 6 wherein the run capacitor remains connected to the start winding when said cutout switch is in said open position.

11. A switch in accordance with claim 10 wherein the start winding operates as an auxiliary run winding when said cutout switch is in said open position.

12. An electric motor for a refrigerator compressor, said motor comprising:
    a rotor;
    a run winding surrounding said rotor;
    a cutout switch electrically connected in series with said run winding;
    a temperature responsive resistor electrically connected in series with said bimetal cutout switch; and
    a start winding surrounding said rotor, said start winding electrically connected in series with said temperature responsive resistor, said temperature responsive resistor regulating the current flowing through said start winding, said cutout switch electrically disconnecting said temperature responsive resistor from said start winding after said temperature responsive resistor reaches a steady state, said cutout switch opening and closing in response to heat generated from current flowing therethrough.

13. A motor in accordance with claim 12 wherein said temperature responsive resistor is a positive temperature coefficient resistor.

14. A motor in accordance with claim 13 wherein said cutout switch comprises a bimetal element.

15. A motor in accordance with claim 14 wherein said cutout switch further comprises a moveable contact and a stationary contact, said bimetal element moving said moveable contact away from said stationary contact at a predetermined temperature.

16. A motor in accordance with claim 15 wherein said motor further includes a run capacitor electrically connected in series with said start winding such that current flows through said run capacitor and said start winding when said cutout switch disconnects said temperature responsive resistor from said start winding.

17. A motor in accordance with claim 12 wherein electrical power to said motor is dissipated only in said run winding and said start winding after said temperature responsive resistor is disconnected.

18. A method for starting an electric motor, the motor including a start winding and a run winding, said method comprising the steps of:
    electrically connecting a bimetal cutout switch in series with the run winding and in series with the start winding;

electrically connecting a temperature responsive resistor element in series with the bimetal cutout switch, the cutout switch preventing current from flowing to the temperature responsive resistor when the bimetal cutout switch is in an open position; and energizing the run winding and the start winding.

19. A method in accordance with claim 18 wherein the temperature responsive resistor element regulates current flowing through the start winding, the temperature responsive resistor having an initial resistance allowing startup currents to flow through the temperature responsive resistor and an ultimate resistance that restricts startup current flowing through the temperature responsive resistor, said method further comprising the step of warming the temperature responsive resistor element to the ultimate resistance by running current through the temperature responsive resistor element.

20. A method in accordance with claim 19 wherein the bimetal cutout switch comprises a bimetal element that completes a circuit and allows startup current to flow through the start winding when the bimetal cutout switch is in a closed position, and the bimetal element breaks a circuit and prevents current flow to the start winding through the bimetal cutout switch when the bimetal cutout switch is in an open position, the open or closed position of the bimetal element being determined by a temperature of the bimetal element, said method further comprising the step of warming the bimetal element in the closed position by running current therethrough until the bimetal element transitions to the open position, thereby electrically disconnecting the temperature responsive resistor element from the start winding.

21. A method in accordance with claim 20 further comprising the step of continuing to run current through the bimetal element when the bimetal element is in the open position, thereby generating heat to maintain the bimetal element in the open position.

* * * * *